Patented May 24, 1949

2,470,772

UNITED STATES PATENT OFFICE 2,470,772

METHOD OF REDUCING THE ADHESION OF ICE TO RUBBERY SURFACES

Eugene G. Haas, Copley Township, Summit County, Ohio, assignor to The B. F. Goodrich Company, New York, N. Y., a corporation of New York No Drawing. Application March 11, 1944, Serial No. 526,140

12 Claims. (Cl. 117—139)

This invention relates to a method of reducing the adhesion of ice to the surface of a material normally subjected to icing conditions, and particularly to such a method wherein the material to be treated is a rubbery material.

It is an object of this invention to provide a simple but highly effective method for reducing the adhesion of ice to surfaces. It is more specifically an object of the invention to provide a method for reducing the adhesion of ice to surfaces of rubbery materials. A further object of the invention is to provide a method for reducing the adhesion of ice to the inflatable elements and other rubbery elements exposed to icing conditions of ice removal apparatus commonly used on the leading edges of airplane wings, and the like. Other objects of the invention will become apparent from the detailed description of the invention given hereinafter.

This invention is useful for treating any solids such as rubbery materials, glass, wood, metal, enamelled metal, and the like, whereby the adhesion of ice to the surfaces of such solids is markedly reduced. The invention is particularly useful for treating rubbery materials such as natural rubber or synthetic rubbers including neoprene, butadiene-styrene copolymers, plasticized polyvinyl chloride, and the like.

By the method of this invention I treat the solid materials by associating with them, at least on the surface, a liquid polymeric silicone or, in some cases, with a mixture of two or more different liquid polymeric silicones. These silicones are prepared by the hydrolysis and subsequent polymerization of an organo-silicon halide having two alkyl, or aryl radicals or one of each radical attached to the silicon atom. Here the unit structure of the liquid polymeric silicone would be

in which R and R₁ are the same or different alkyl or aryl radicals. In the usual case, however, the organo-silicon halide from which the silicone is prepared will be a mixture of halides in which the silicon atoms will have one, two, or three alkyl or aryl radicals, or a mixture of both, attached to them. This mixture will result in a silicone made up of not only the above unit structure but also a structure of

when the parent halide is a monoalkyl or aryl compound, and a unit structure of

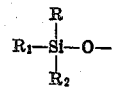

when the parent halide is a tri-alkyl, aryl, or mixed, compound. In the usual silicone all three unit structures are represented. For the purposes of this discussion, therefore, silicones include not only the product of the hydrolysis and polymerization of organo-silicon halides having two hydrocarbon radicals on the silicon, but also those products prepared from mixtures of organo-silicon halides containing one, two, and three such hydrocarbon radicals. However, as used in this invention, the liquid polymeric silicones will consist essentially of those compounds in which the

unit structure predominates.

With the polymeric silicones described hereinabove polymerization may be continued by merely heating the compounds until very hard horny or glassy solids are produced. However, for the purposes of this invention it is necessary that polymerization be not carried to completion but that the polymers be liquid. As used herein and in the claims, therefore, the term liquid polymeric silicones is intended to designate only those silicones where polymerization is incomplete so that the silicones are liquid at ordinary temperatures. It will generally be desirable, however, in order to avoid undue loss of the silicone by evaporation, to carry the polymerization far enough to produce a liquid product which, at least as to its major portion, is substantially nonvolatile at ordinary temperatures.

Among the liquid polymeric silicones useful in this invention are those prepared by the hydrolysis and polymerization of the following organo-silicon halides: dimethyl silicon dichloride, diethyl silicon dichloride, dipropyl silicon dichloride, methylethyl silicon dichloride, dimethyl silicon dibromide, diphenyl silicon dichloride, methylphenyl silicon dibromide, and many others, as well as mixtures of the above with mono- and tri-alkyl or aryl silicon halides. One of the best of the liquid polymeric silicones is that prepared by hydrolyzing and partially polymerizing a mixture of a minor proportion of monomethyl silicon trichloride and a major proportion of dimethyl silicon dichloride in which there is a very minor proportion of trimethyl silicon chloride. In this silicone all the unit structures discussed above appear.

The liquid polymeric silicones may be applied to the surface of the solid material or, where the nature of the solid material permits, as with rubbery materials, they may be compounded directly into the material, preferably in an amount of from 1% to 15% based on the weight of the rubbery material, or similar solid material. When applied to the surface they are preferably applied directly, although they may be used in the form of solutions if desired. When applied in the form of solutions any suitable solvent may be used. These solvents include hydrocarbons, halogen-substituted hydrocarbons, esters, ketones, and the like.

As the method of this invention is particularly useful in decreasing the adhesion of ice to rubbery materials it finds a wide application in the treatment of the inflatable elements and other rubbery elements of ice removal apparatus for aircraft, such as the devices supplied under the trade name "De-Icer." The liquid polymeric silicones are either applied directly to the surface of the rubbery material, or they are compounded in the rubbery material used in constructing the inflatable units.

In a typical example of the invention a liquid polymeric silicone was prepared from a mixture of dimethyl silicon dichloride and monomethyl silicon trichloride containing traces of trimethyl silicon chloride. The silicone, which had an initial boiling point of around 165° C. was applied directly to the surface of the inflatable elements of the ice removal apparatus which were made from vulcanized neoprene. When the treated surface was subjected to icing conditions the resulting ice was found to have an adhesion of only about 11 pounds per square inch, as compared to an adhesion of 72 pounds per square inch on an untreated surface of the same kind.

Although the liquid polymeric silicones may be used with any ordinary solid materials to decrease the adhesion of ice thereon, they are particularly useful with rubbery materials for the reason that the silicones may be applied either on the surface of the finished rubbery material, or they may be compounded and mixed into the rubbery material during the course of its preparation. In both cases they form a tough film over the surface that is freely elastic and extensible and so will not be broken when the rubbery material is stretched. Thus, the liquid polymeric silicones are especially useful on the rubbery elements of ice removal apparatus commonly used on aircraft exposed to icing conditions.

Having disclosed my invention in considerable detail it is my intention that it not be limited by these details unless otherwise specifically indicated, but rather that it be construed broadly within the true spirit and scope of the invention as set out in the accompanying claims.

I claim:

1. The method of reducing the adhesion of ice to the surface of a rubbery material normally subjected to icing conditions which comprises associating with at least the surface of said rubbery material a liquid polymeric silicone, and providing thereby a resulting extensible elastic film on said surface stretchable with the rubbery material and resistant to adhesion of ice under said icing conditions.

2. The method of reducing the adhesion of ice to the surface of a rubbery material normally subjected to icing conditions which comprises applying to said surface a composition comprising a liquid polymeric silicone, and providing thereby a resulting extensible elastic film on said surface stretchable with the rubbery material and resistant to adhesion of ice under said icing conditions.

3. The method of reducing the adhesion of ice to the surface of a rubbery material normally subjected to icing conditions which comprises associating with at least the surface of said rubbery material a liquid polymeric silicone, said silicone having been prepared by the hydrolysis of a mixture of dimethyl silicon dichloride and monomethyl silicon trichloride and subsequent polymerization to the liquid stage, and providing thereby a resulting extensible elastic film on said surface stretchable with the rubbery material and resistant to adhesion of ice under said icing conditions.

4. The method of reducing the adhesion of ice to the surface of a rubbery material normally subjected to icing conditions which comprises applying to said surface a composition comprising a liquid polymeric silicone, said silicone having been prepared by the hydrolysis of a mixture of dimethyl silicon dichloride and monomethyl silicon trichloride and subsequent polymerization to the liquid stage, and providing thereby a resulting extensible elastic film on said surface stretchable with the rubbery material and resistant to adhesion of ice under said icing conditions.

5. The method of making ice-removing apparatus which comprises admixing a liquid polymeric silicone with rubbery material and forming the mixture to provide a flexible ice-removing device, said silicone providing on an exposed surface of said device an extensible and elastic film stretchable with the rubbery material.

6. The method of making ice-removing apparatus which comprises admixing a liquid polymeric silicone with a rubbery material and forming an inflatable structure from the mixture, said silicone providing on an exposed surface of said structure an extensible and elastic film stretchable with the rubbery material upon inflation of the said structure.

7. The method of treating an ice-removing device having an exposed surface of rubbery material to reduce adhesion of ice thereto which comprises applying to said exposed rubbery surface an extensible and elastic film derived from a liquid polymeric silicone.

8. The method of treating an inflatable ice-removing device having an exposed surface of rubbery material to reduce adhesion of ice thereto which comprises applying to the exposed rubbery surface of said device a film of liquid polymeric silicone, said silicone forming on said surface an extensible and elastic film stretchable with the rubbery material.

9. Ice-removing means resistant to the adhesion of ice under icing conditions comprising an inflatable structure having an exposed surface of rubbery material exteriorly coated with an extensible and elastic film derived from a liquid polymeric silicone, and resistant to the adhesion of ice under said icing conditions.

10. Ice-removing means resistant to the adhesion of ice under icing conditions comprising an inflatable structure having an exposed surface of rubbery material comprising a liquid polymeric silicone for reducing adhesion of ice thereto and resistant to the adhesion of ice under said icing conditions.

11. Ice-combatting means resistant to the adhesion of ice under icing conditions comprising a flexible elastic element of rubbery material having on an exposed surface thereof a liquid polymeric silicone and resistant to the adhesion of ice under said icing conditions.

12. Ice-combatting means resistant to the adhesion of ice under icing conditions comprising a flexible elastic element of rubbery material having on an exposed surface thereof an extensible and elastic film derived from a liquid polymeric silicone and resistant to the adhesion of ice under said icing conditions.

EUGENE G. HAAS.

REFERENCES CITED

The following references are of record in the file of this patent:

UNITED STATES PATENTS

| Number | Name | Date |
|---|---|---|
| 1,890,286 | Geer | Dec. 6, 1932 |
| 2,258,218 | Rochow | Oct. 7, 1941 |